US008420197B2

(12) United States Patent
Giraud et al.

(10) Patent No.: US 8,420,197 B2
(45) Date of Patent: Apr. 16, 2013

(54) INJECTION MOLDING PROCESS FOR MOLDING MECHANICAL INTERLOCKS BETWEEN MOLDED COMPONENTS

(75) Inventors: Jean-Pierre Giraud, Paris (FR); Michel Zbirka, Jouy-sur-Morin (FR)

(73) Assignee: CSP Technologies, Inc., Amsterdam, NY (US)

( * ) Notice: Subject to any disclaimer, the term of this patent is extended or adjusted under 35 U.S.C. 154(b) by 0 days.

(21) Appl. No.: 13/185,017

(22) Filed: Jul. 18, 2011

(65) Prior Publication Data
US 2012/0009410 A1 Jan. 12, 2012

Related U.S. Application Data

(62) Division of application No. 12/160,153, filed as application No. PCT/US2007/010833 on May 4, 2007, now abandoned.

(60) Provisional application No. 60/746,438, filed on May 4, 2006.

(51) Int. Cl.
*B32B 7/08* (2006.01)
*B32B 1/06* (2006.01)

(52) U.S. Cl.
USPC .......................................... 428/58; 428/138

(58) Field of Classification Search ............... 428/34.1, 428/58, 138; 264/268, 267, 269, 270, 246, 264/247, 255, 273, 274
See application file for complete search history.

(56) References Cited

U.S. PATENT DOCUMENTS

| 4,124,676 | A | * | 11/1978 | Henzl ........................ 264/250 |
| 5,008,060 | A | | 4/1991 | Kanai et al. |
| 5,131,778 | A | | 7/1992 | Asai et al. |
| 5,911,937 | A | | 6/1999 | Hekal |
| 6,080,350 | A | | 6/2000 | Hekal |

(Continued)

FOREIGN PATENT DOCUMENTS

| DE | 10252648 A1 | 5/2004 |
| GB | 2404895 A | 2/2005 |

(Continued)

OTHER PUBLICATIONS

PCT International Searching Authority, Notification of Transmittal of the International Search Report and the Written Opinion of the International Searching Authority, or the Declaration, in International application No. PCT/US2007/010833, dated Jul. 2, 2008.

(Continued)

*Primary Examiner* — Alexander Thomas
(74) *Attorney, Agent, or Firm* — McAndrews, Held & Malloy, Ltd.

(57) ABSTRACT

A two-shot or multi-shot multi-material injection molding process is provided. The process allows dissimilar materials to be injection molded to form a single, injection molded part by creating a structural interlock between the materials to prevent the materials from separating. The structural interlock is formed by forming at least one interlock cavity adjacent to a interfacial surface of a first portion of a molded part molded from a first material, and injecting a second, different material into the mold so that the second material flows into the interlock cavity and fills it. Solidification of the second material in the interlock cavity formed by the first material creates the structural interlock between the two materials.

19 Claims, 14 Drawing Sheets

U.S. PATENT DOCUMENTS

| | | | |
|---|---|---|---|
| 6,124,006 | A | 9/2000 | Hekal |
| 6,130,263 | A | 10/2000 | Hekal |
| 6,174,952 | B1 | 1/2001 | Hekal |
| 6,214,255 | B1 | 4/2001 | Hekal |
| 6,221,446 | B1 | 4/2001 | Hekal |
| 7,063,811 | B2 * | 6/2006 | Brozenick et al. ............ 264/510 |
| 2003/0178427 | A1 | 9/2003 | Chomik |

FOREIGN PATENT DOCUMENTS

| | | |
|---|---|---|
| JP | 55057441 A | 4/1980 |
| JP | 57189834 A | 11/1982 |
| WO | WO86/06273 A1 | 11/1986 |

OTHER PUBLICATIONS

PCT International Searching Authority, Notification Concerning Transmittal of International Preliminary Report on Patentability, in International application No. PCT/US2007/010833, dated Nov. 13, 2008.

European Patent Office, Communication with extended European search report, in European application No. 07809038.8, dated Dec. 13, 2010.

State Intellectual Property Office of the People's Republic of China, Notification of First Office Action, in Chinese application No. 200780005288.X, dated Mar. 22, 2011.

Japanese Patent Office, Notice of Reason(s) for Rejection, in Japanese application No. 2009-509742, dated Dec. 16, 2011.

State Intellectual Property Office of the People's Republic of China, Notification of the First Office Action, in Application No. 200780005288.X, dated Mar. 22, 2011.

State Intellectual Property Office of the People's Republic of China, Notification of the First Office Action, in Application No. 200780005288.X, dated May 24, 2012.

* cited by examiner

INJECTION MOLDING PROCESS FOR MOLDING MECHANICAL INTERLOCKS BETWEEN MOLDED COMPONENTS

RELATED APPLICATIONS

This patent application is a divisional application of U.S. patent application Ser. No. 12/160,153, filed on Nov. 21, 2008, which was nationalized from International Application No. PCT/US2007/010833, filed on May 4, 2007 and which makes reference to, claims priority to and claims benefit from U.S. Provisional Patent Application Ser. No. 60/746,438 filed on May 4, 2006.

FIELD OF THE INVENTION

The present technology relates to a method of molding different materials to form an individual injection molded part. More particularly, the present technology relates to an injection molding method that creates a structural interlock between two different materials that allows the two different materials to be used to form a single, injection molded part.

BACKGROUND OF THE INVENTION

Consumer are demanding smaller bulk packages that incorporate greater functionality (i.e., one-by-one product presentation and resealability). These bulk packages, especially bulk packages that must also have other functional requirements, such as moisture-resistance and resealability, is particularly challenging to produce because the functional requirements often necessitate the use of multiple parts and materials. However, the use of fasteners to join components together adds to the component count and, most importantly, takes up valuable space.

Two-shot or multi-shot injection molding allows different materials having different functional properties to be molded into a single part without the need to use fasteners to join the materials together. The two materials are typically joined to each other by means of a weld defined by the interface solidification of melted portions of the two materials. In order to form such a weld, however, the different materials must be chemically similar or compatible. This limits the selection of materials that can be used to fabricate the molded part.

There is still a need for an injection molding method that enables mechanical interlocking to occur between dissimilar materials, thereby maximizing the functionality of the component part without regard to chemical similarity or compatibility of the materials, and without the need to employ separate fasteners or utilize adhesives.

SUMMARY OF THE INVENTION

One aspect of the present technology is directed to a method of molding that creates a structural interlock between two different materials.

Another aspect of the present technology is directed to an injection molding process that employs design characteristics that enable mechanical interlocking to occur between dissimilar materials without the use of fasteners or adhesives.

A further aspect of the present technology is a two-shot or multi-shot injection molding process wherein a first material is injected into a mold cavity to form a first portion of a molded part. The first portion includes an interfacial surface and at least one interlock cavity formed adjacent to the interfacial surface. A second material is injected into the mold cavity so that the second material contacts the interfacial surface and flows into the at least one interlock cavity. Solidification of the second material in the at least one interlock cavity formed in the first portion of the molded part creates a mechanical interlock between the first and second materials which prevents the two materials from being separated, and results in an injection molded part formed from dissimilar materials without the need for fasteners or adhesives.

An aspect of the invention is an injection molded part formed from at least two materials that includes a first material that forms a bowl-shaped first portion of the molded part. The first portion includes a base located at the bottom of the first portion and a side wall that extends generally upwardly from the base. The side wall has an inner surface, the inner surface and base generally defining an inner recess of the bowl-shaped first portion. A portion of the inner surface forms an interfacial surface. At least one interlock cavity formed adjacent to the interfacial surface within the side wall. A second material is disposed within at least a portion of the inner recess that forms a second portion of the molded part. The second material is configured to be in contact with the interfacial surface and occupy the at least one interlock cavity to provide a mechanical interlock between the first material and the second material that prevents the first and second materials from being separated.

Another aspect of the invention is an injection molded part formed from at least two materials that includes a first portion formed from a first material. The first portion has a base portion and a sidewall. The sidewall extends from the base, the sidewall having an inner surface, an outer surface, and a top surface. The inner surface is positioned adjacent to an inner recess of the first portion. At least a portion of the inner surface has an interfacial surface. At least one interlock cavity is formed within the sidewall and adjacent to the interfacial surface. A second portion is formed from a second material disposed within at least a portion of the inner recess. The second portion is configured to be in contact with the interfacial surface and extends into the at least one interlock cavity to provide a mechanical interlock between the first portion and the second portion.

A further aspect of the invention is an injection molded part formed from at least two materials including a bowl-shaped first portion formed from a first material. The bowl-shaped first portion has a base portion and a sidewall. The sidewall extends from the base, the sidewall having an inner surface and an outer surface. The inner surface is positioned adjacent to an inner recess of the bowl-shaped first portion. The inner surface is an interfacial surface of the bowl-shaped first portion that includes at least one opening for an interlock cavity formed in the side wall. A second portion formed from a second material is disposed within at least a portion of the inner recess. The second portion is configured to be in contact along the length of the interfacial surface and extends through the opening and into the at least one interlock cavity to provide a mechanical interlock between the bowl-shaped first portion and the second portion.

In one embodiment of the molding process described herein a passive interlock is created wherein the at least one interlock cavity has an opening at the interfacial surface to allow the second material to flow into the interlock cavity.

In another embodiment of the molding process described herein, an active interlock is created wherein the at least one interlock cavity is blocked by a thin wall formed from the first material, and fill pressure from the second material breaches the wall, thereby allowing the second material to flow into the at least one interlock cavity.

Formation of the mechanical interlock advantageously allows dissimilar materials to be used in forming an injection molded part thereby allowing the selection of materials based upon the functional properties or characteristics needed without regard to chemical similarity. However, the mechanical interlock may be used to join similar materials where material adhesion does not provide enough strength. For example, similar materials may include polypropylene as the first material and a polypropylene impregnated with an electrically conductive compound (e.g., carbon black) as the second material.

Other advantages and features of the present invention will become apparent from the following detailed description of the invention, from the claims, and from the accompanying drawings.

DETAILED DESCRIPTION OF THE INVENTION

Figure 1:
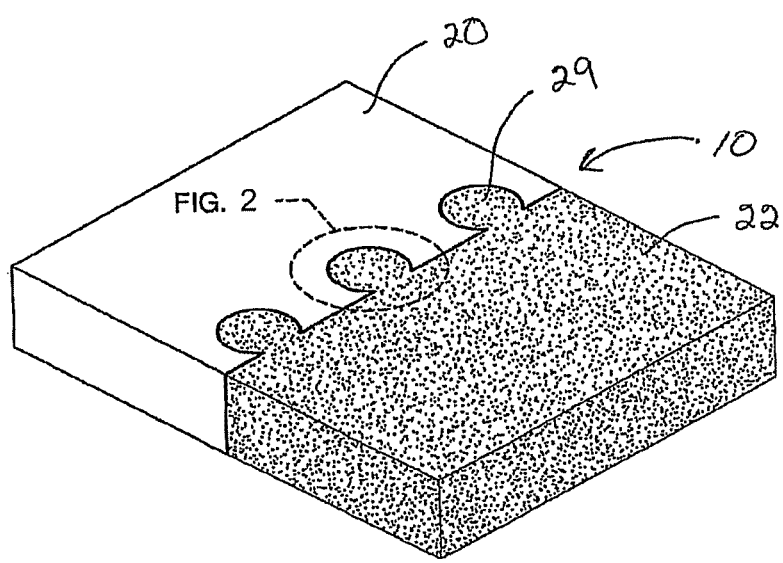
FIG. 1 is a perspective view of a two-shot injection molded part made by one embodiment of the process of the present technology.

The present technology describes methods for molding a molded part formed from at least two materials that exhibit different chemical and/or physical properties. One of the materials is molded to form a first portion of the molded part which includes an interfacial surface and at least one interlock cavity adjacent to the interfacial surface. The other material is molded to form the remainder of the molded part and flows into the interlock cavity created in the first portion of the molded part. When the second material solidifies within the interlock cavity, it creates a mechanical interlock at the interfacial surface that prevents the two materials from being separated. The mechanical interlock is not dependent on adhesion between the materials.

In one embodiment of the present technology, a passive interlock is created at the interfacial surface by forming the interlock cavity so as to have an opening at the interfacial surface that allows the second material to flow into the interlock cavity. In another embodiment of the present technology, an active interlock is created at the interfacial surface by forming the interlock cavity so that a thin wall of first material separates the interlock cavity from the mold section receiving the second material. Fill pressure from the second material shot is used to breach the thin wall, thereby allowing the second material to flow into the interlock cavity. Each type of interlock can be created in different ways to form both butt joints and lap joints between dissimilar materials.

The formation of the interlock cavities in the first portion of the molded part followed by the molding and solidification of the second material within the interlock cavities has several advantages. No molding undercut is formed in forming the interlock cavities. In molding processes, the molding of undercuts often is considered undesirable because undercuts make the molded part more difficult to extract from the mold. Typically, the part must be molded from a flexible material in order to facilitate extraction of the part from the mold, which limits the choice of materials for the part, or the mold is complicated to design and manufacture, thereby increasing the cost of production of the part. In the present process, however, the interlock cavities are formed by pins that can easily be removed from the mold cavity, thereby simplifying the mold design.

Although the molding method described herein is particularly suitable for two-shot or multi-shot injection molding processes, the method can also be used in overmold processes. Using an overmolding process, a previously molded part is inserted into a mold and a second material is overmolded about the molded part. The use of mechanical interlocks, especially with materials that do not adhere together, are useful in joining the overmolded component to the previously molded part.

The materials that can be used to form the injection molded part can be virtually any polymeric material that is capable of being injection molded. If the injection molded part is to be used in a package or container the polymer materials must also be compatible with the product to be stored in the container. Suitable polymeric materials include polyethylene (PE—high density, low density, LLD, VLLD), polypropylene (PP), polyvinyl chloride (PVC), high impact polystyrene (HIPS), cyclic olefin co-polymer (CoC) polyethylene vinyl acetate (EVA), polystyrene (PS), polycarbonate (PC), polyester terephthalate (PET), polyamide (nylon), acetal copolymer or homopolymer resin, and liquid crystal polymer.

As used herein, "dissimilar" means materials with different physical and/or chemical properties. Dissimilar materials may be of a different grade of a thermoplastic resin where each grade has specific physical or chemical properties. For example, a co-polymer (e.g., ethylene vinyl acetate co-polymer) may have different properties based on the ratio (and arrangement) of the co-polymer components.

In one embodiment, one of the selected materials for forming a portion of the injection molded part can be an active polymer composition that absorbs or releases a gas. For example, the active polymer composition may incorporate a desiccant. Suitable desiccants include, but are not limited to, silica gel, molecular sieve, calcium carbonate and naturally occurring clay compounds, including, but not limited to montmorillonite clay.

Alternatively, the desiccant composition includes one or more of the following desiccant plastic compositions comprising formulations that are used to mold shaped articles comprising 2-phase and 3-phase compositions. A 2-phase composition is one that comprises a desiccant and a polymer. A 3-phase composition is one that comprises a desiccant and at least 2 immiscible polymers.

The polymer is preferably selected from a group of thermoplastics that include polyolefins (for example: polyethylene (LDPE, LLDPE, HDPE and polypropylene) may be used. Suitable 3-phase desiccant entrained plastic compositions include, but are not limited to, the desiccant plastics disclosed in one or more of the following U.S. Pat. Nos. 5,911,937, 6,214,255, 6,130,263, 6,080,350 and 6,174,952, 6,124,006, and 6,221,446. These references are incorporated herein by reference.

Particular combinations of dissimilar polymers that are envisaged for use in the present two-shot injection molding process include, but are not limited to, a nylon and a liquid crystal polymer material, a polystyrene and an acetal copolymer or homopolymer resin, and a desiccant entrained plastic and an acetal resin. For example, a part that needs to have anti-static properties in one area and high temperature resistance in another area could be molded from a nylon material for its anti-static properties and a liquid crystal polymer for its heat resistance properties. As another example, a part that needs to have moisture resistance in one area and provide a bearing surface in another area could be molded from a desiccant entrained plastic for the portion that must have moisture resistance and from an acetal resin to form the bearing surface. In a further example the exposed portion of the part can be composed of polycarbonate and the interior portion of the part could be composed of desiccant plastic. The polycarbonate protects the desiccant plastic portion of the part from abrasion and/or dusting. Other material combinations will occur to one of skill in the art.

Various embodiments of the molding method of the present invention will now be discussed with reference to the drawings. It is to be understood that the invention is not intended to be limited to the embodiments described herein, and the scope of the invention will be pointed out in the appended claims.

A two-shot injection molded part 10 made according to one embodiment of the method of the present invention is illustrated in FIGS. 1-6. The injection molded part 10 is formed by injecting a first material, which can be, for example, a nylon, into a mold cavity 12 to form a first portion 20 of the injection molded part. The mold cavity 12 includes a plurality of pins 16 placed adjacent to one wall of the mold cavity 12, and intersecting what will become the interface between the first and second materials. When the first material is injected into the mold cavity 12, it flows partially around the pins, resulting in a plurality of interlock cavities 24 in the first portion that each have an opening 26 at the interfacial surface 28 of the molded first portion. Although a plurality of interlock cavities are illustrated in the first portion 20, it will be appreciated that the number of interlock cavities could be one, two, or more cavities depending upon the size of the part, the size of the cavity, and the materials selected to form the part.

It is important that the opening 26 to each interlock cavity has a size that is less than the diameter of the interlock cavity, alternatively less than half the diameter of the interlock cavity so that the opening is restricted or narrow. This restricted opening is wide enough to allow the second material to flow into the interlock cavity, but narrow enough to act as a mechanical anchor that prevents the second material from being pulled apart from the first material after solidification, as explained further below.

Figure 2:
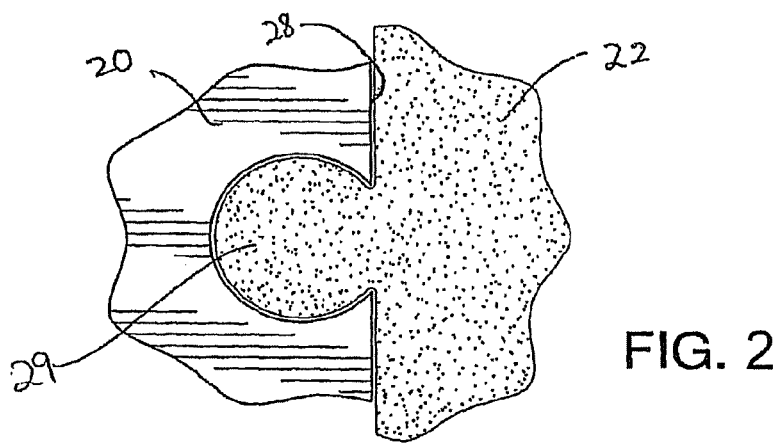
FIG. 2 is a detailed view of the mechanical interlock between the two materials forming the injection molded part shown in FIG. 1.
Figure 3:
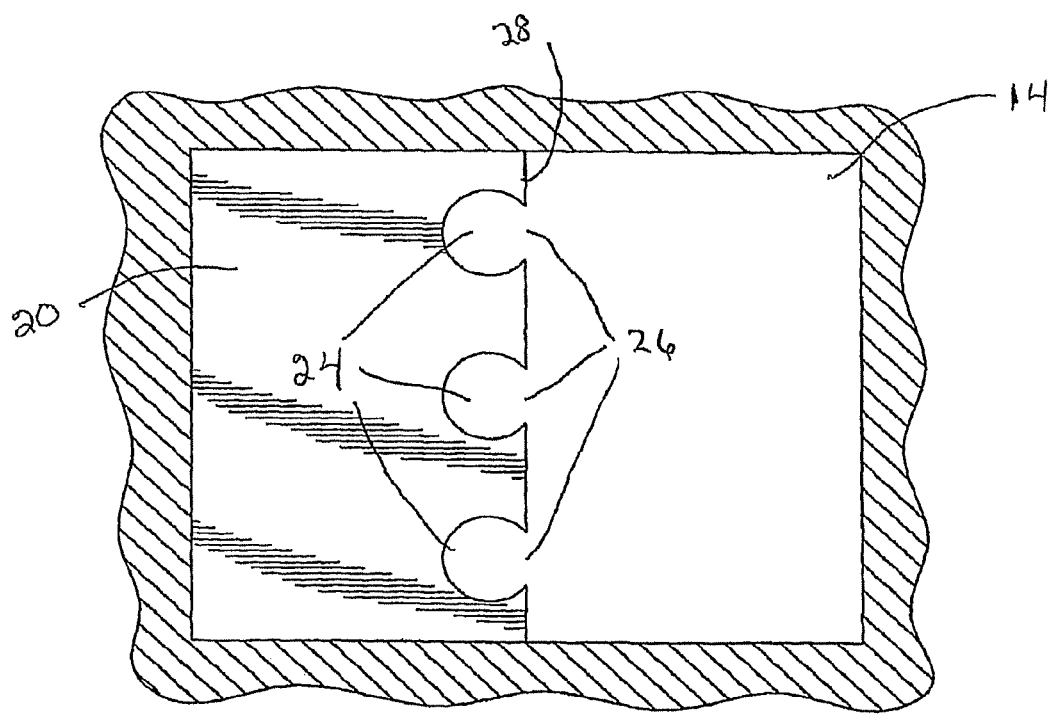
FIG. 3 is a cutaway view of the first material forming a portion of the injection molded part and the interlock cavities for receiving the second material; the molding cavity is shown in section.
Figure 4:
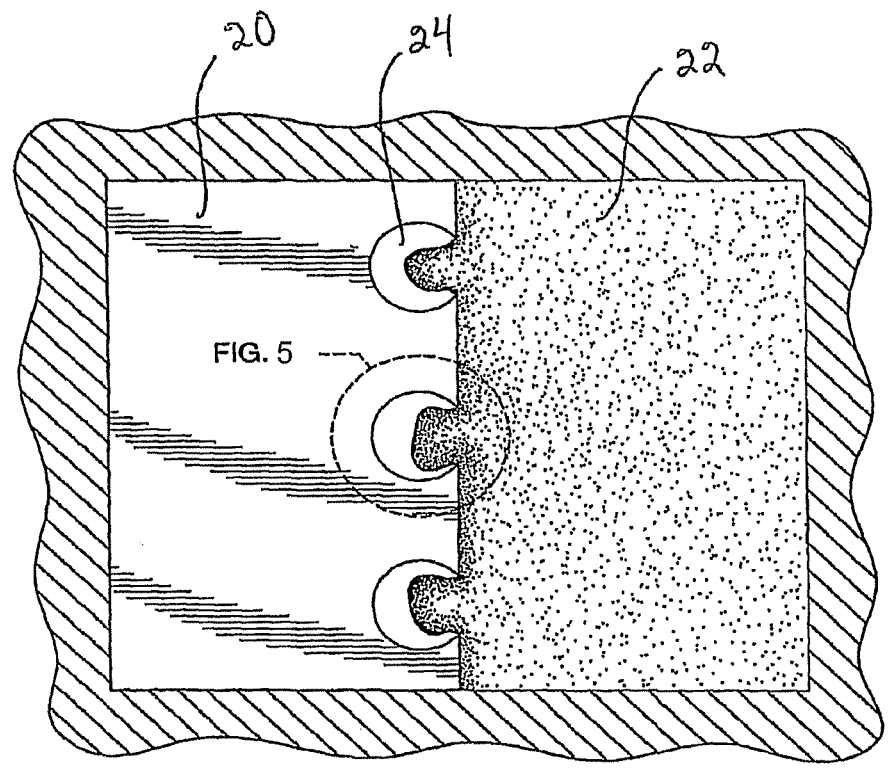
FIG. 4 is a cutaway view of the second material filling a second mold and flowing into the interlock cavities formed by the first material.
Figure 5:
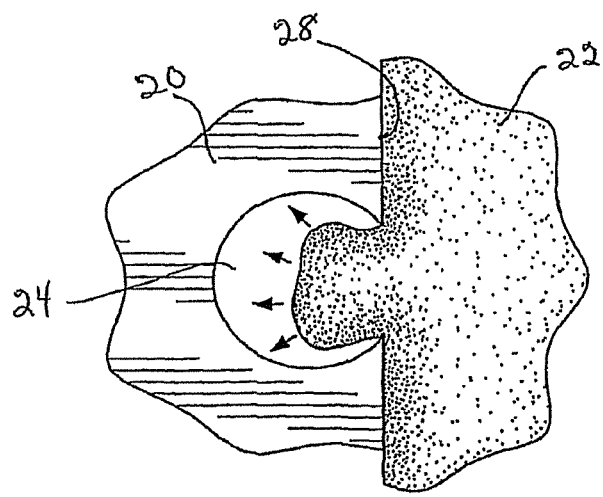
FIG. 5 is a detailed view of a partially filled interlock cavity shown in FIG. 4.
Figure 6:
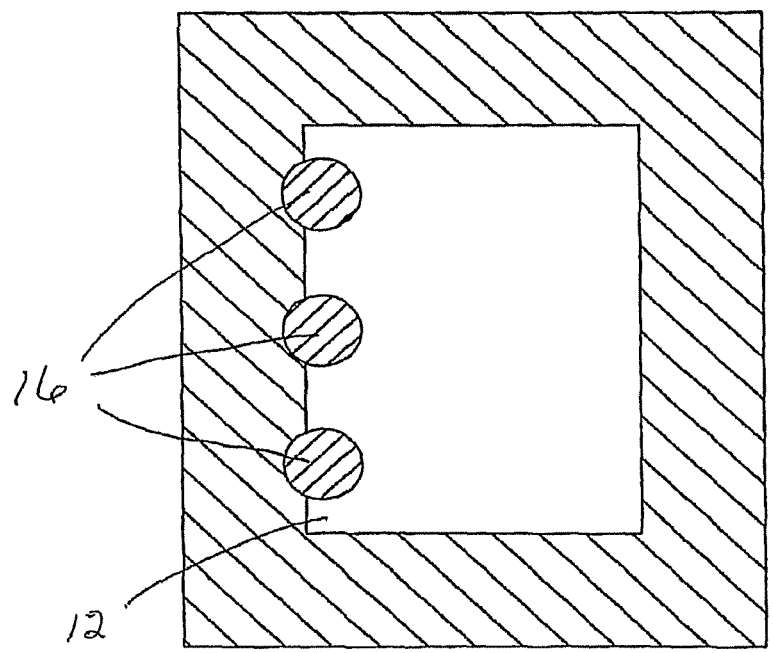
FIG. 6 is a cutaway sectional view of the mold cavity for molding the first material.
Figure 7:
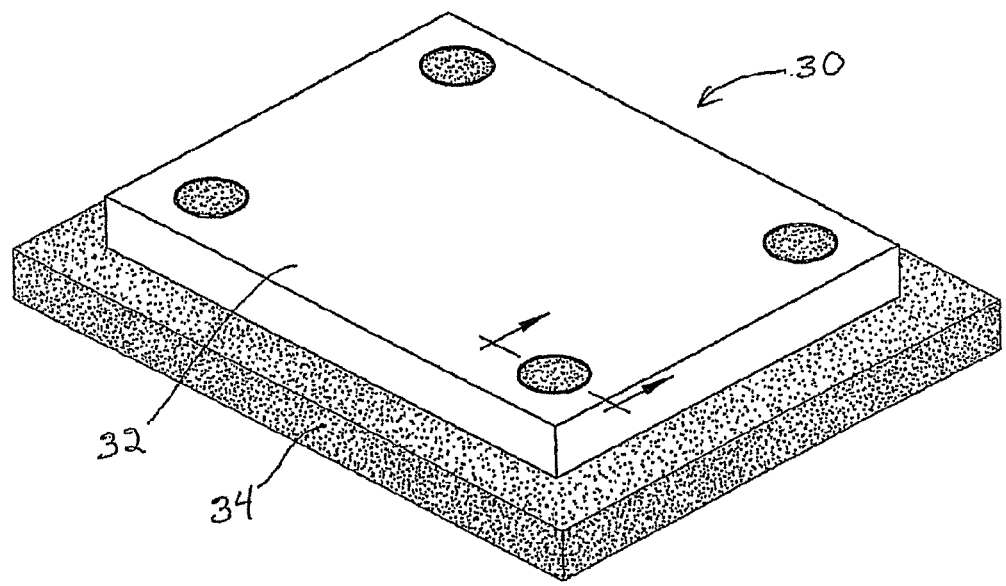
FIG. 7 is a perspective view of a second embodiment of a two-shot injection molded part made in accordance with the present technology.

After molding the first material to form the first portion of the injection molded part, the mold is opened and rotated to a second mold cavity 14, the mold is closed, and a second material, which can be, for example, a liquid crystal polymer material, is injected into the mold cavity 14. The second material contacts the interfacial surface 28 of the molded first portion and flows into the interlock cavities 24 formed in the first portion 20, as shown in FIGS. 4 and 5, forming a second portion 22 of the molded part. A mechanical interlock 29 is then created between the first and second materials by the cooling and solidification of the second material in the interlock cavities formed in the first material, as shown in FIGS. 1 and 2.

A two-shot injection molded part made according to another embodiment of the injection molding process of the present invention is illustrated in FIGS. 7-12. The 7-12 embodiment would be suitable for a part that needs to have moisture resistance in one area and provide a bearing surface in another area. The injection molded part 30 has a first portion 32, that is molded from a first material and that overlaps a second portion 34. The second portion 34 is molded from a second material that differs from the first material in at least one property. The injection molded part 30 is formed by injection molding the first material in a mold cavity to form the first portion 32 of the injection molded part. The mold cavity is provided with a plurality of generally frustaconically-shaped pins that project downwardly from the top of the mold cavity (as oriented in FIG. 8). The frustaconically-shaped pins have their base end at the top of the mold cavity, while the smaller diameter end intersects what will become the interface between the first and second materials.

Figure 8:
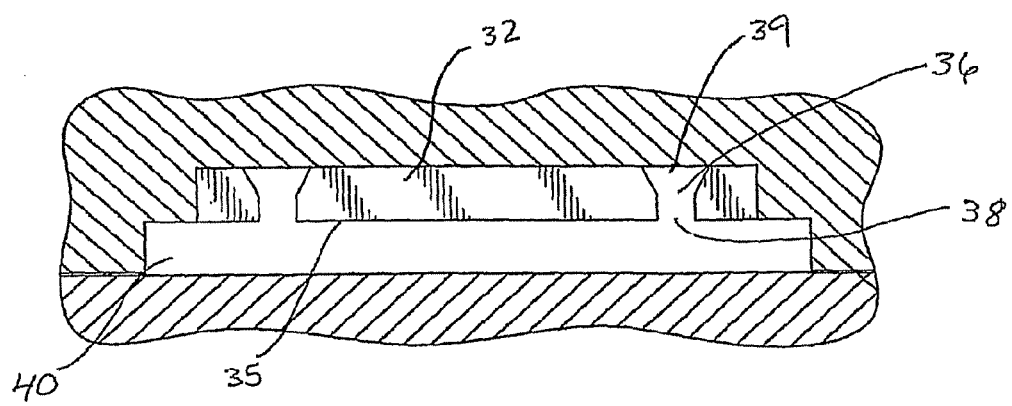
FIG. 8 is a cross-sectional view of the injection mold for the embodiment shown in FIG. 7, but showing the portion of the injection molded part and the interlock cavities formed by the first material.

When the first material is injected into the mold cavity, it flows around the pins, resulting, upon solidification, in a plurality of interlock cavities 36 that extend completely through the molded first portion. Because of the shape of the pins, the resulting interlock cavities 36 have an opening 38 at the interfacial surface 35 of the molded first portion that is smaller than the opening 39 at the opposite end of the interlock cavity, as shown in FIG. 8.

Figure 9:
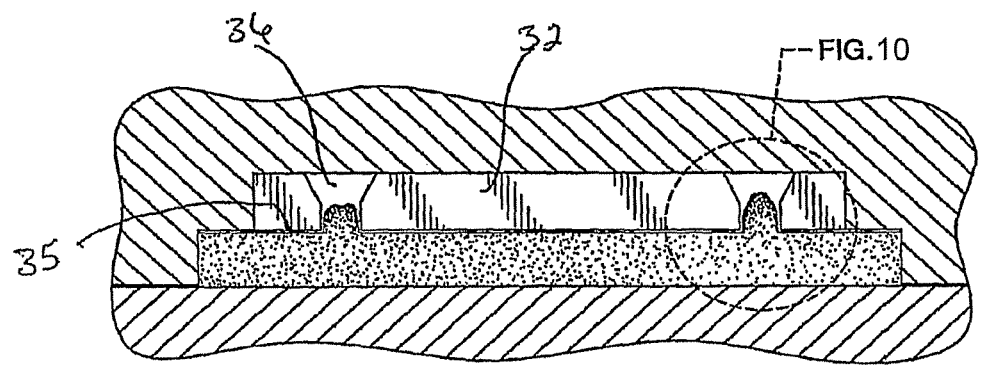
FIG. 9 is a cross-sectional view of the injection mold, illustrating the second material flowing into the interlock cavities formed by the first material.
Figure 10:
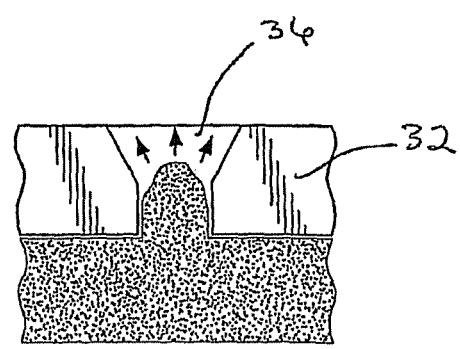
FIG. 10 is a detailed view of a partially filled interlock cavity shown in FIG. 9.
Figure 11:
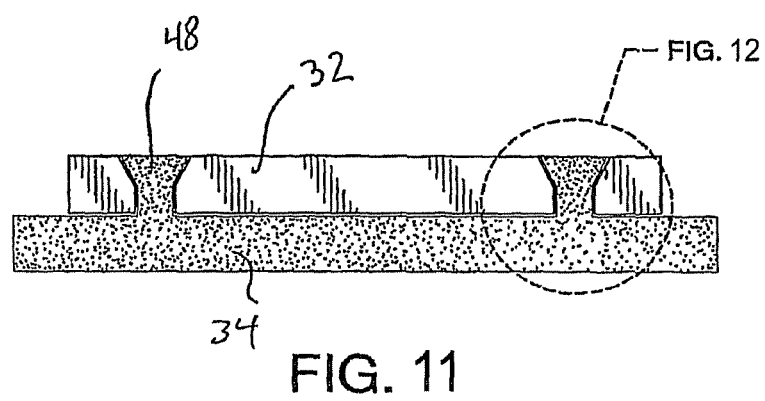
FIG. 11 is a cross-sectional view of the injection molded part shown FIG. 7, illustrating the interlock cavities completely filled by the second material.
Figure 12:
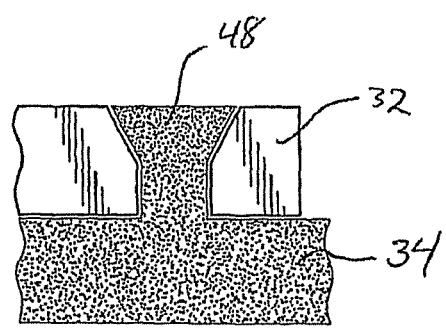
FIG. 12 is a detailed view of a filled interlock cavity shown in FIG. 11.
Figure 13:
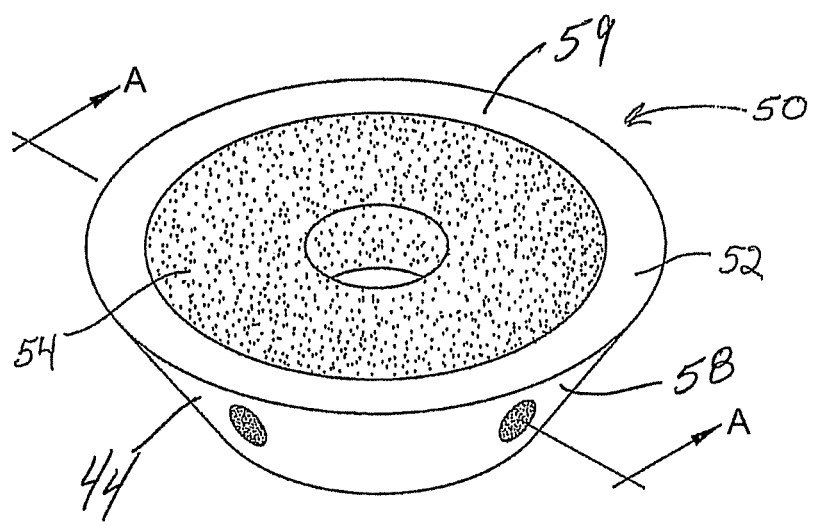
FIG. 13 is a perspective view of another embodiment of a two-shot injection molded part made in accordance with the present technology.

After molding the first material to form the first portion of the injection molded part, the pins are removed. The mold is opened and rotated to a second mold cavity 40, the mold is closed, and the second material is injected into the second mold cavity. The second material fills the second mold cavity, contacts the interfacial surface 35 and flows into the interlock cavities 36 formed in the first portion, as shown in FIGS. 9 and 10. Solidification of the second material in the interlock cavities formed in the first material creates a mechanical interlock 48 between the first and second materials, as illustrated in FIGS. 11 and 12, by forming a neck portion of solidified second material that is more narrow than the diameter of the filled interlock cavity.

Another embodiment of a two-shot injection molded part made in accordance with the present process is illustrated in FIGS. 13-17. The two-shot injection molded part 50 has a first portion 52, molded from a first material, and a second portion 54 molded from a second material that differs from the first material in at least one property. The embodiment illustrated in FIGS. 13-17 is suitable for a molded part wherein the second portion is comprised of a desiccant entrained plastic and the first portion 52 is comprised of a polycarbonate to provide protection for the desiccant plastic portion and protect it from abrasion and/or dusting. The first portion 52 is bowl-shaped and has a base 42 at a bottom portion thereof, and sidewall 44 extending from the base 42, the sidewall 44, having an inner surface 56 that forms an interfacial surface 53, an outer sidewall 58, and a top surface 59. The base 42 and side wall 44 together define an inner recess 46 of the first portion 52.

The injection molded part 50 is formed by injection molding the first material in a mold cavity 60 to form the first portion of the injection molded part. The mold cavity 60 is generally concave and has a base 61 at a bottom portion thereof and a sidewall 63 extending from the base 61, together defining an inner recess, analogous to the shape of the first portion 52, as described above. The mold cavity 60 is provided with a plurality of pins that project inward from the wall of the mold cavity. Each pin has a larger diameter end that is adjacent to the mold cavity wall and a smaller diameter end that intersects what will become the interface between the first and second materials.

Similar to the embodiment shown in FIGS. 7-12, when the first material is injected into the mold cavity 60, it flows around the pins, resulting, upon solidification, in a plurality of interlock cavities 62 that extend completely through the first portion 52, in a generally downward and radially outward direction, from the inner sidewall 56, forming the interfacial surface 53, to the outer sidewall 58. As indicated by "L" in at least FIG. 16, the second material may be in contact along the length of the interfacial surface of the first portion. Each interlock cavity 62 has an opening 64 at the interfacial surface 53 that has a diameter that is smaller than the diameter of the opening at the outer sidewall 58.

Figure 14:
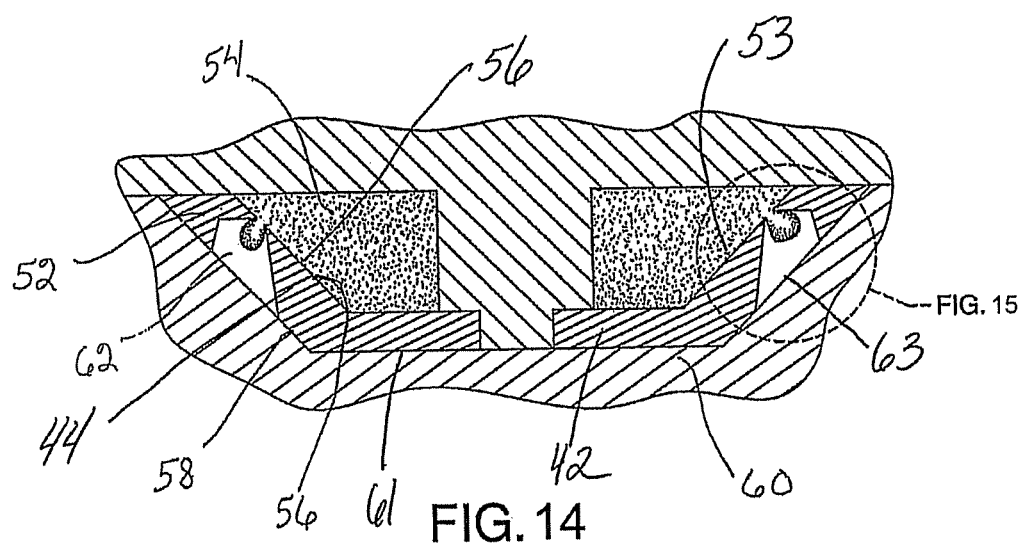
FIG. 14 is a cross-sectional view taken along lines A-A in FIG. 13, illustrating the second material flowing into the interlock cavities formed by the first material.
Figure 15:
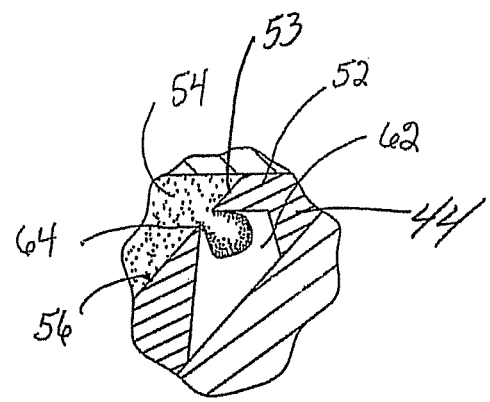
FIG. 15 is a detailed view of a partially filled interlock cavity show in FIG. 14.
Figure 16:
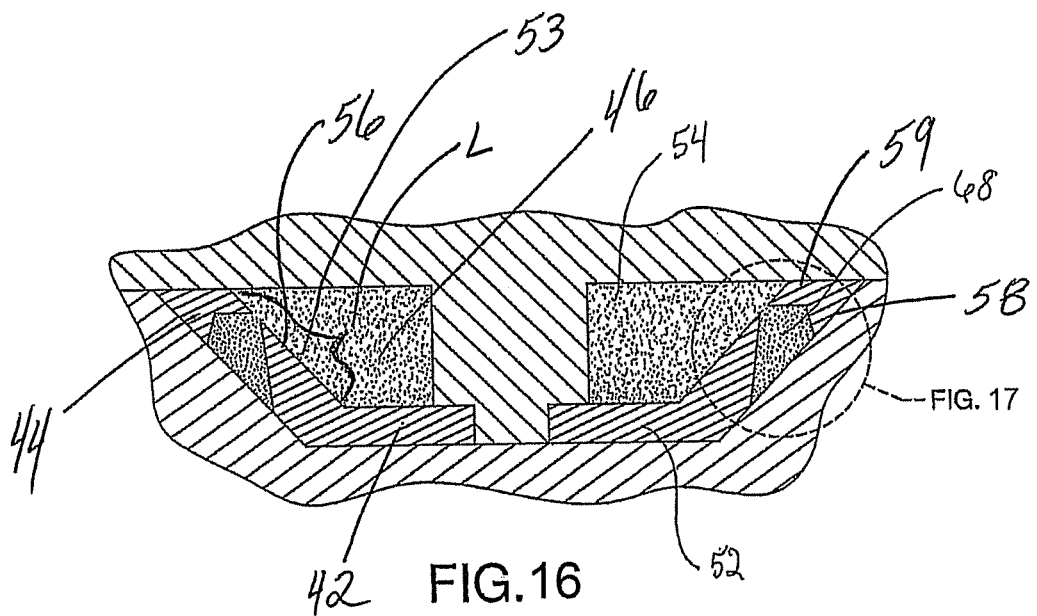
FIG. 16 is a cross-sectional view taken along lines A-A in FIG. 13, illustrating the interlock cavities completely filled by the second material.
Figure 17:
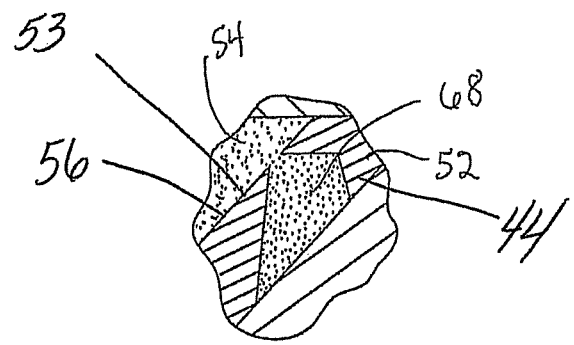
FIG. 17 is a detailed view of a filled interlock cavity shown in FIG. 16.

After forming the first portion 52, the mold 60 is opened and rotated to a second mold cavity. The mold is then closed and the second material is injected into the second mold cavity to form the second portion 54 of the molded part. The second material fills the second mold cavity, contacts the interfacial surface 53, and flows into the interlock cavities 62 formed in the first portion 52, as shown in FIGS. 14 and 15. Solidification of the second material in the interlock cavities 62 formed in the first portion 52 creates a mechanical interlock 68 between the first and second materials, as illustrated in FIGS. 16 and 17.

Figure 18:
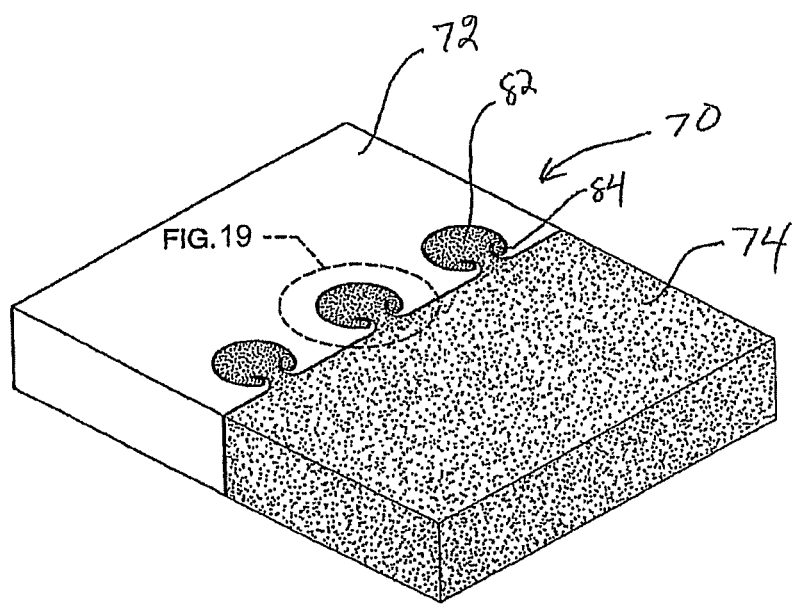
FIG. 18 is a perspective view of a two-shot injection molded part made by an alternative embodiment of the process of the present technology.
Figure 19:
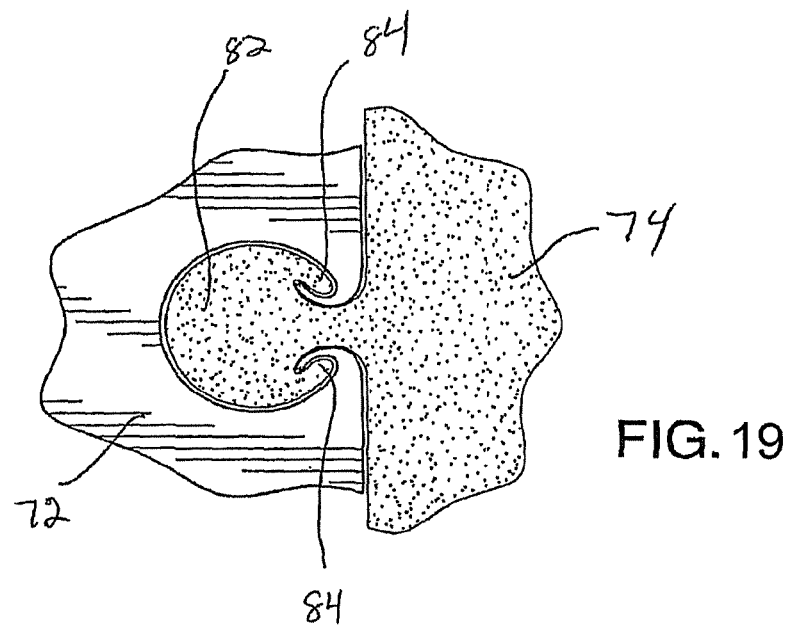
FIG. 19 is a detailed view of the mechanical interlock between the two materials forming the injection molded part shown in FIG. 18.
Figure 20:
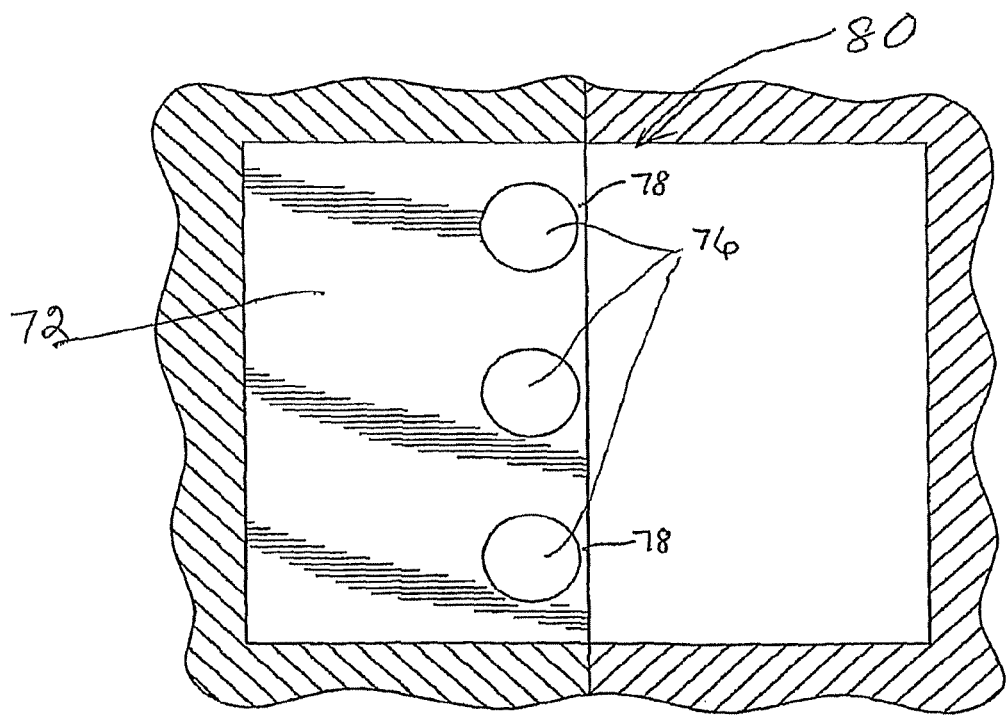
FIG. 20 is a cutaway view of the first material forming a portion of the injection molded part shown in FIG. 18 and the interlock cavities for receiving the second material, with the interlock cavities closed by walls formed from the first material; the mold cavity is shown in section.

A further embodiment of the injection molding process of the present invention, illustrating the use of an active interlock, is described with reference to FIGS. 18-22. The injection molded part 70 has a first portion 72, formed from a first material, and a second portion 74 formed from a second material that differs from the first material in at least one property. The molding of the first and second materials is similar to the process described in connection with FIGS. 1-6, except that the pins are positioned in the mold cavity so that they are adjacent to but do not intersect what will become the interface between the first and second materials. When the first material is injected into the mold cavity 80, it flows completely around the pins, resulting, upon solidification, in a plurality of interlock cavities 76 in the first portion 72 that are closed off from the second mold cavity by a thin wall 78 formed from the first material as shown in FIG. 20. The wall has a thickness ranging from about 0.005 to about 0.010 inches (0.125 mm to 0.250 mm).

Figure 21:
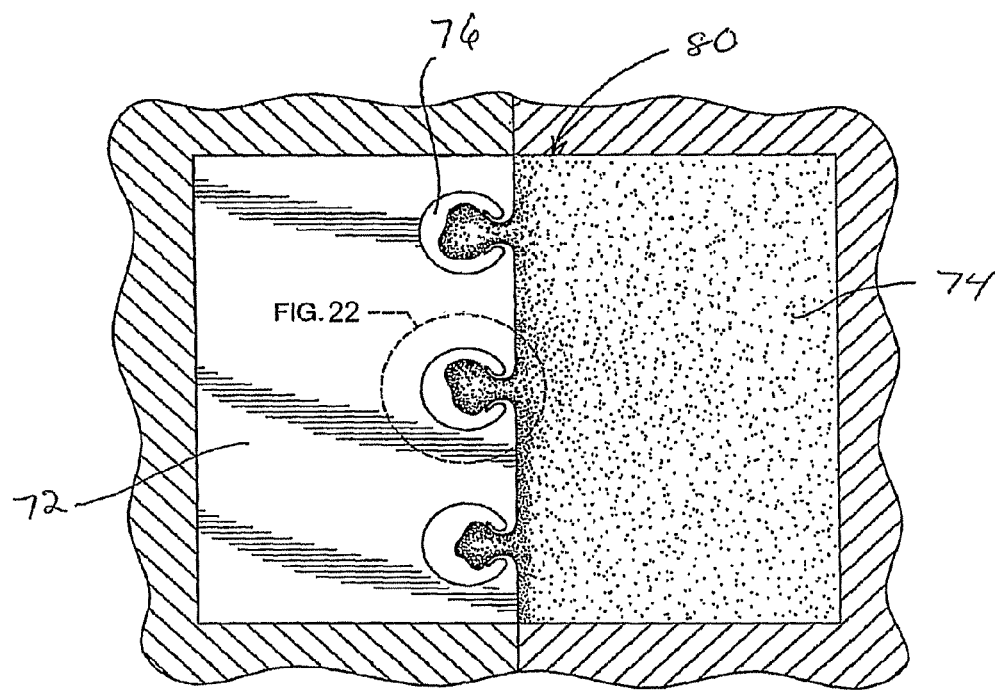
FIG. 21 is a cutaway view of the second material breaking the walls formed by the first material and flowing into the interlock cavities formed by the first material.
Figure 22:
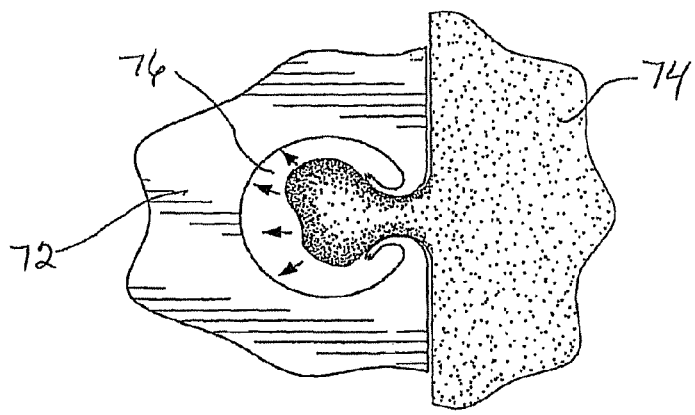
FIG. 22 is a detailed view of a partially filled interlock cavity shown in FIG. 21.

When the second material is injected into the second mold cavity, fill pressure from the injection breaks the wall 78, allowing the second material to flow into the interlock cavities 76 formed in the first portion 72, as shown in FIGS. 21 and 22. Solidification of the second material in the interlock cavities 76 creates a mechanical interlock 82 between the first and second materials. Further, when the thin-walled section of the interlock cavity is broken, the second material flows around the broken portions of the walls to create additional mechanical anchors 84, as shown in FIGS. 18 and 19, that further prevent the two materials from being pulled apart.

Figure 23:
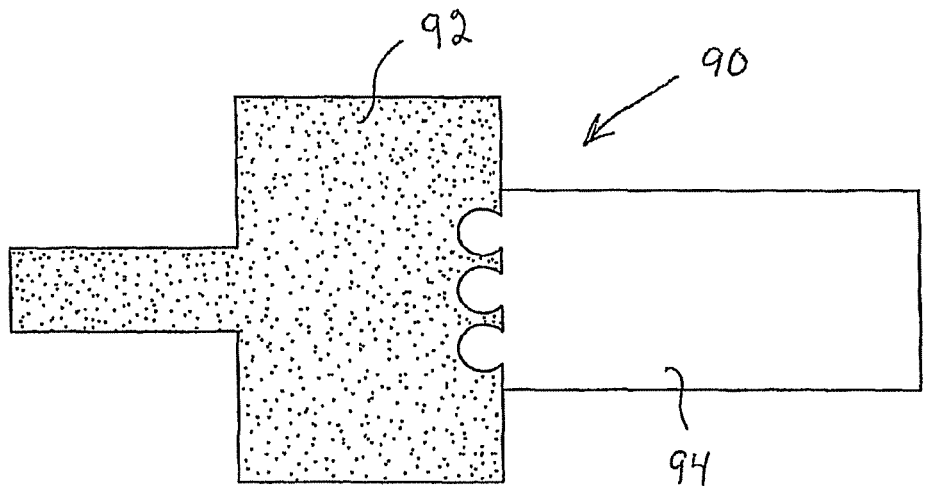
FIG. 23 is a top plan view of another embodiment of an injection molded part made by the process of the present technology.
Figure 24:
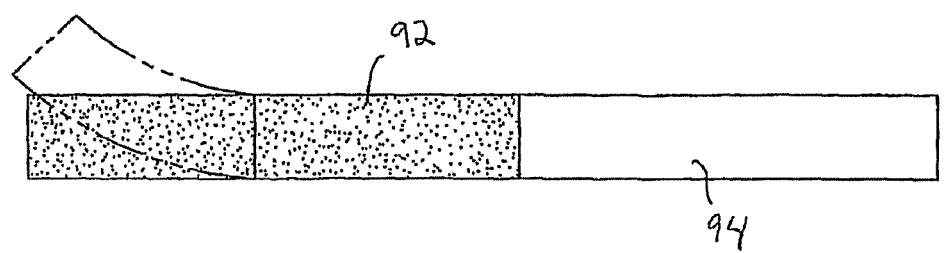
FIG. 24 is a side view of the injection molded part of FIG. 23.

Another embodiment of an injection molded part made in accordance with the method of the present technology is shown in FIGS. 23 and 24. The molding process described in connection with FIGS. 1-6 is used to mold the part 90. A first portion 92 is molded from a first material, such as a polycarbonate, that can flex, as shown in FIG. 24, and has a memory that enables the first portion of the part to be used as a type of spring. A second portion 94 is molded from a second material, such as a desiccant entrained plastic.

The invention has now been described in such full, clear, concise and exact terms as to enable any person skilled in the art to which it pertains to practice the same. It is to be understood that the foregoing describes preferred embodiments and examples of the invention, and that modifications may be made therein without departing from the spirit or scope of the invention as set forth in the claims.

The invention claimed is:

1. An injection molded part formed from at least two materials comprising:
   (a) a first injection molded material that forms a concave, bowl-shaped first portion of the molded part, the first portion including a base located at the bottom of the first portion and a side wall that extends generally upwardly and outwardly from the base the side wall having an inner surface and an outer surface, the inner surface and base generally defining an inner recess of the concave, bowl-shaped first portion, a portion of the inner surface forms an interfacial surface, at least one interlock cavity formed adjacent to the interfacial surface within the side wall, the at least one interlock cavity extending between the inner surface and the outer surface, the at least one interlock cavity further having a first opening at the inner surface and a second opening at the outer surface, the first opening being smaller than the second opening; and (b) a second injection molded material disposed within at least a portion of the inner recess that forms a second portion of the molded part, the second injection material not being disposed against the outer surface of the side wall, the second injection molded material configured to be in contact with the interfacial surface and occupy the at least one interlock cavity, the at least one cavity configured to provide a mechanical interlock between the first portion and the second portion that prevents the first and second portions from being separated.

2. The injection molded part of claim 1, wherein the first portion includes at least two anchors that extend from the inner surface into a portion of the at least one interlock cavity.

3. The injection molded part of claim 1, wherein the first opening of the at least one interlock cavity is less than one-half the diameter of the second opening.

4. The injection molded part of claim 1, wherein the first portion of the molded part has a plurality of interlock cavities formed within the side wall adjacent to the interfacial surface.

5. The injection molded part of claim 1, wherein the first and second injection molded materials are dissimilar.

6. The injection molded part of claim 5, wherein the first injection molded material comprises a polycarbonate resin and the second injection molded material comprises a desiccant entrained polymer.

7. The injection molded part of claim 1, wherein the side wall has a generally frusto-conical shape.

8. The injection molded part of claim 1, wherein the at least one interlock cavity is asymmetrical about a centerline that is perpendicular to the side wall and that extends through a center point of the first opening.

9. The injection molded part of claim 1, wherein the at least one interlock cavity extends in a generally radially outward direction.

10. An injection molded part formed from at least two materials comprising:
(a) a first portion formed from a first injection molded material, the first portion having a base portion and a sidewall, the sidewall extending from the base, the sidewall having an inner surface, an outer surface, and a top surface, the sidewall extending upwardly and outwardly from the base such that the distance between opposing sides of the sidewall at the base is smaller than the distance between the opposing sides of the sidewall at the top surface, the inner surface positioned adjacent to an inner recess of the first portion, at least a portion of the inner surface having an interfacial surface, at least one interlock cavity formed within the sidewall and adjacent to the interfacial surface, the at least one interlock cavity having a first opening at the inner surface and a second opening at the outer surface, the at least one interlock cavity also being asymmetrical about a centerline that is perpendicular to the sidewall and that extends through a center point of the first opening; and
(b) a second portion formed from a second injection molded material disposed within at least a portion of the inner recess, the second portion configured to be in contact with the interfacial surface and extends into the at least one interlock cavity, the at least one cavity configured to provide a mechanical interlock between the first portion and the second portion that prevents the first and second portions from being separated.

11. The injection molded part of claim 10, wherein the at least one interlock cavity has a second opening at the outer surface, first opening being smaller than the second opening.

12. The injection molded part of claim 10, wherein the first and second injection molded materials are dissimilar.

13. The injection molded part of claim 12, wherein the first injection molded material comprises a polycarbonate resin and the second injection molded material comprises a desiccant entrained polymer.

14. The injection molded part of claim 10, wherein the side wall has a generally frusto-conical shape.

15. The injection molded part of claim 10, wherein the at least one interlock cavity extends in a generally downward direction.

16. The injection molded part of claim 10, wherein the at least one interlock cavity extends in a generally radially outward direction.

17. An injection molded part formed from at least two materials comprising:
(a) a bowl-shaped first portion formed from a first injection molded material, the bowl-shaped first portion having a base portion and a sidewall, the sidewall extending upwardly and outwardly from the base, the sidewall having an inner surface and an outer surface, the inner surface positioned adjacent to an inner recess of the bowl-shaped first portion, the inner surface being an interfacial surface of the bowl-shaped first portion that includes at least one opening for an interlock cavity formed in the side wall, the interlock cavity being asymmetrical about a centerline that is perpendicular to the sidewall and that extends through center point of the at least one opening; and
(b) a second portion formed from a second injection molded material disposed within at least a portion of the inner recess, the second portion configured to be in contact along the length of the interfacial surface and extends through the at least one opening and into the at least one interlock cavity, the at least one interlock cavity configured to provide a mechanical interlock between the bowl-shaped first portion and the second portion that prevents the first and second portions from being separated.

18. The injection molded part of claim 17, wherein the first and second injection molded materials are dissimilar.

19. The injection molded part of claim 18, wherein the first injection molded material comprises a polycarbonate resin and the second injection molded material comprises a desiccant entrained polymer.

* * * * *